(12) United States Patent
Narimatsu et al.

(10) Patent No.: US 11,531,806 B2
(45) Date of Patent: Dec. 20, 2022

(54) TAG ASSIGNMENT MODEL GENERATION APPARATUS, TAG ASSIGNMENT APPARATUS, METHODS AND PROGRAMS THEREFOR USING PROBABILITY OF A PLURALITY OF CONSECUTIVE TAGS IN PREDETERMINED ORDER

(71) Applicant: NIPPON TELEGRAPH AND TELEPHONE CORPORATION, Tokyo (JP)

(72) Inventors: Hiromi Narimatsu, Musashino (JP); Hiroaki Sugiyama, Musashino (JP); Masahiro Mizukami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 151 days.

(21) Appl. No.: 17/044,334

(22) PCT Filed: Apr. 1, 2019

(86) PCT No.: PCT/JP2019/014467
§ 371 (c)(1),
(2) Date: Oct. 1, 2020

(87) PCT Pub. No.: WO2019/194124
PCT Pub. Date: Oct. 10, 2019

(65) Prior Publication Data
US 2021/0081597 A1    Mar. 18, 2021

(30) Foreign Application Priority Data
Apr. 3, 2018 (JP) .............................. JP2018-071308

(51) Int. Cl.
*G06F 40/117* (2020.01)
*G06F 40/289* (2020.01)
*G06F 40/253* (2020.01)

(52) U.S. Cl.
CPC .......... *G06F 40/117* (2020.01); *G06F 40/253* (2020.01); *G06F 40/289* (2020.01)

(58) Field of Classification Search
None
See application file for complete search history.

(56) References Cited

U.S. PATENT DOCUMENTS 8,060,357 B2 * 11/2011 Segond .................. G06F 16/31
704/7
9,311,299 B1 * 4/2016 Petrov ..................... G06F 40/40
(Continued)

FOREIGN PATENT DOCUMENTS

WO    2008/146583 A1    12/2008

OTHER PUBLICATIONS

Kuniko Saito et al., "Unique Expression Extraction from Blogs Using CRF", Web literature, Mar. 22, 2018, URL:http://www.anlp.jp/proceedings/annual_meeting/2007/pdf_dir/D1-3.pdf.
(Continued)

*Primary Examiner* — Ariel Mercado
(74) *Attorney, Agent, or Firm* — Xsensus LLP

(57) ABSTRACT

Provided is a technique for generating a tagging model for attaching a tag in consideration of a phrase based on dependency between words. A tagging model generation apparatus includes a learning section 2 which generates, by using inputted learning data, a tagging model including probability-related information serving as information related to the probability that each tag is associated with each word-related information, and joint probability-related information serving as information related to a joint prob-
(Continued)

ability which serves as the probability of appearance of each tag in which appearance frequencies of a plurality of consecutive tags associated with pieces of word-related information of a plurality of consecutive words in each text are taken into consideration, and a storage section 3 which stores the generated tagging model.

7 Claims, 8 Drawing Sheets

(56) References Cited

U.S. PATENT DOCUMENTS

| | | | |
|---|---|---|---|
| 10,963,497 B1* | 3/2021 | Tablan | G06F 16/3344 |
| 2009/0157645 A1* | 6/2009 | Green | G06F 16/48 |
| | | | 707/999.005 |
| 2010/0174527 A1 | 7/2010 | Sadamasa et al. | |
| 2019/0188326 A1* | 6/2019 | Daianu | G06N 3/08 |

OTHER PUBLICATIONS

Nakanokeiko, Hiraiyuuzo, "Use of Clause Information in Japanese Unique Expression Extraction", IPSJ Journal, Information Processing Society Journal, Mar. 15, 2004, 934-941.

Akihiko, Kato et al., "MWE-based Dependent Structure CorpusConstruction and Analysis Considering UniqueExpressions and Complex Functional Words", Collection of papers presented at the 23 Annual Meeting of the Japan Society for Language Processing, Mar. 6, 2017, 42-45.

Isamu, Fujiwara et al., "Statistical Hierarchical Phrase Machine Translation with Syntactic Tags", The 18 Annual Meeting of the Japan Society of Language Processing, Mar. 31, 2012, 255-258.

Hiromi Narimatsu et al., Analysis of Phrases Expressing Locations inChatting Conversations and Study of Detection Methods, Materials of the Research Society of the Japan Society of Population and Intelligence, Oct. 12, 2017.

* cited by examiner

Fig. 5

| WORD | POS | TAG |
|---|---|---|
| <S> | BOS | START |
| KYOU | NOUN: DATE AND TIME: CONJUNCTIVE | NL |
| WA | CONJUNCTIVE PARTICLE | NL |
| EKIMAE | NOUN | B-LOC |
| NO | CASE PARTICLE | I-LOC |
| RAMENN | NOUN | I-LOC |
| YA | NOUN SUFFIX | I-LOC |
| NI | CASE PARTICLE: CONJUNCTIVE | NL |
| I | VERB STEM | NL |
| T | VERB CONJUGATED WORD | NL |
| TE | VERB INFLECTED SUFFIX | NL |
| KI | VERB STEM | NL |
| TA | VERB SUFFIX | NL |
| . | PERIOD | NL |
| </S> | EOS | END |

Fig. 8

| EXPLANATION OF LOCATION AMBIGUITY LABEL | LOCATION AMBIGUITY LABEL (NUMBER) |
|---|---|
| I did not wonder | 0 |
| I attached a label tentatively but I wondered whether or not the word or phrase was a target to which the label should be attached | 1 |
| I entered a likely word or phrase but I wondered where a sentence was to be segmented. | 2 |
| I attached a label tentatively but I wondered whether or not the word or phrase was a target to which the label should be attached and wondered where a sentence was to be segmented. | 3 |

TAG ASSIGNMENT MODEL GENERATION APPARATUS, TAG ASSIGNMENT APPARATUS, METHODS AND PROGRAMS THEREFOR USING PROBABILITY OF A PLURALITY OF CONSECUTIVE TAGS IN PREDETERMINED ORDER

CROSS-REFERENCE TO RELATED APPLICATIONS

The present application is based on PCT filing PCT/JP2019/014467, filed Apr. 1, 2019, which claims priority to JP 2018-071308, filed Apr. 3, 2018, the entire contents of each are incorporated herein by reference.

TECHNICAL FIELD

The invention relates to a technique for generating a model for attaching a tag to each word in text, or a technique for attaching a tag to each word in text by using a generated model.

BACKGROUND ART

As a technique for attaching a tag of a location or the like to each word in text, there is known a named entity extraction technique described in NPL 1.

In the technique in NPL 1, a named entity is extracted by using a CRF (Conditional Random Field). In the technique in NPL 1, a proper noun or the like is assumed to be the named entity to be extracted. In addition, in the technique in NPL 1, Chinese characters/hiragana letters/katakana letters/English letters are used as feature values used in learning of a model for attaching a tag, and a change point of a letter type (from a Chinese character to a hiragana letter) serves as a basic break of a tag.

Consequently, by using the technique in NPL 1, for example, it is possible to extract named entities of locations "NIPPON" and "FUJISANN" from text "NIPPON NIWA FUJISANN GA ARU.". In other words, by using the technique in NPL 1, it is possible to attach a tag "location name" to each of "NIPPON" and "FUJISANN".

In addition, by using the technique in NPL 1, for example, it is possible to extract a named entity "TOUKYOU TAWA" from text "TOUKYOU TAWA NI NOBOTTA.". In other words, by using the technique in NPL 1, it is possible to attach the tag "location name" to "TOUKYOU TAWA".

Further, by using the technique in NPL 1, for example, it is possible to extract a named entity "TOUKYOU" from text "TOUKYOU NI ARU TAWA NI NOBOTTA.". In other words, by using the technique in NPL 1, it is possible to attach the tag "location name" to "TOUKYOU".

CITATION LIST

Non Patent Literature

[NPL 1] Saito, K., Suzuki, J., Imamura, K., "Named entity extraction from blog with CRF", [online], 2007, [retrieved on March 22, H30], the Internet <URL: http://www.anlp.jp/proceedings/annual_meeting/2007/pdf_dir/D1-3.pdf>

SUMMARY OF THE INVENTION

Technical Problem

Incidentally, in a system which understands speech of human beings such as, e.g., an automated response system or a dialogue system, in order to acquire information on locations more accurately, instead of "TOUKYOU", the whole "TOUKYOU NI ARU TAWA" needs to be collectively recognized as a location from the text "TOUKYOU NI ARU TAWA NI NOBOTTA.".

However, in the technique in NPL 1, when the text "TOUKYOU NI ARU TAWA NI NOBOTTA." is inputted, it is not possible to recognize the whole "TOUKYOU NI ARU TAWA" collectively as the location. In other words, it is not possible to attach a tag of "location" to "TOUKYOU NI ARU TAWA".

That is, in the technique in NPL 1, it is not possible to attach the tag in consideration of a phrase based on dependency between words.

An object of the invention is to provide a tagging model generation apparatus which generates a tagging model for attaching a tag in consideration of a phrase based on dependency between words, a tagging apparatus which attaches the tag in consideration of the phrase based on dependency between words by using the generated tagging model, a tagging model generation method, a tagging method, and a program.

Means for Solving the Problem

A tagging model generation apparatus according to an aspect of the invention includes: a learning section that generates a tagging model by using inputted learning data, the learning data being a plurality of pieces of text-related information corresponding to a plurality of pieces of text, each of the plurality of pieces of text-related information serving as information related to the text, each of the plurality of pieces of text-related information having word-related information, the word-related information serving as information related to each word included in the text and including at least part-of-speech information, each of the plurality of pieces of text-related information having a tag which is associated with the word-related information of each word and in which a phrase based on dependency between words is taken into consideration, the tagging model including probability-related information and joint probability-related information, the probability-related information serving as information related to a probability that each tag is associated with each word-related information, the joint probability-related information serving as information related to a joint probability, the joint probability serving as a probability of appearance of each tag in which appearance frequencies of a plurality of consecutive tags associated with pieces of word-related information of a plurality of consecutive words in each text are taken into consideration; and a storage section that stores the generated tagging model.

A tagging apparatus according to an aspect of the invention includes: a tagging section for attaching, by using the tagging model generated by the tagging model generation apparatus and word-related information serving as information related to each word included in inputted text, a likely tag to each word in the inputted text; and an output section for outputting a phrase consisting of a plurality of consecutive words to which predetermined tags are attached by the tagging section or the text in which the tag is attached to each word by the tagging section.

Effects of the Invention

According to the invention, it is possible to generate the tagging model for attaching the tag in consideration of the phase based on dependency between words. In addition, according to the invention, it is possible to attach the tag in consideration of the phrase based on dependency between words by using the generated tagging model.

BRIEF DESCRIPTION OF THE DRAWINGS

FIG. 5 is a view showing examples of word-related information and a correct tag.

FIG. 8 is a view showing an example of classification of location ambiguity labels.

DESCRIPTION OF EMBODIMENTS

Figure 1:
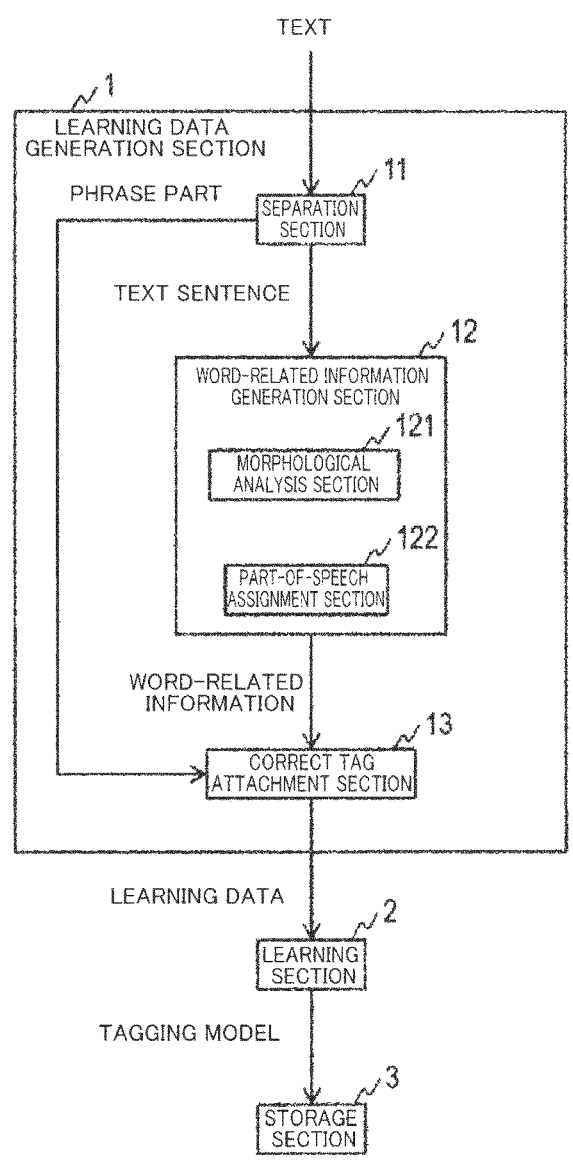
FIG. 1 is a view showing an example of the functional configuration of a tagging model generation apparatus.

Hereinbelow, embodiments of the invention will be described in detail. Note that constituent sections having the same function in the drawings are designated by the same number, and a duplicate description thereof will be omitted.

As will be described later, while various tags can be attached by a tagging model generation apparatus, a tagging model generation method, a tagging apparatus, and a tagging method, a description will be made by using, as an example, the case where a tag of "location" is attached in the following description.

[Tagging Model Generation Apparatus and Tagging Model Generation Method]

As shown in FIG. 1, the tagging model generation apparatus includes, e.g., a learning data generation section 1, a learning section 2, and a storage section 3.

As shown in FIG. 1, the learning data generation section 1 includes, e.g., a separation section 11, a word-related information generation section 12, and a correct tag attachment section 13.

The word-related information generation section 12 includes a morphological analysis section 121 and a part-of-speech assignment section 122.

Figure 2:
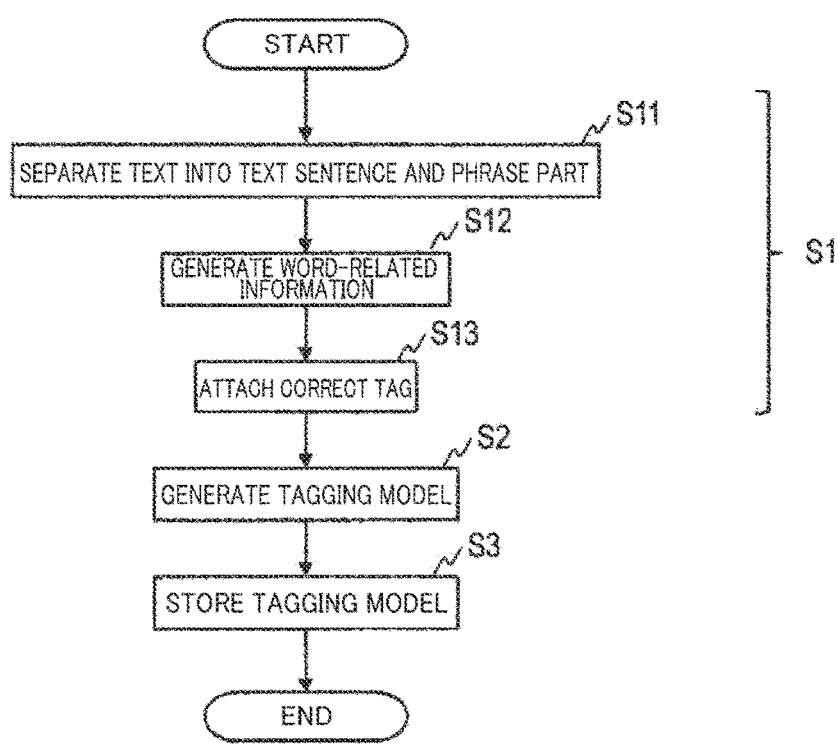
FIG. 2 is a view showing an example of a process procedure of a tagging model generation method.

The individual sections of the tagging model generation apparatus perform the following and processes from S1 to S3 shown by way of example in FIG. 2, and the tagging model generation method is thereby implemented.

[[Learning Data Generation Section 1]]

A plurality of pieces of text in which a part of a phrase based on dependency between words is indicated are inputted into the learning data generation section 1.

The text may be text obtained by transcribing actual speech when people chat, may be text obtained by a voice recognition system, may be chat data, or may also be any text data such as a monologue or a story.

The part of the phrase based on dependency between words denotes a part serving as a target for attachment of a tag, and is provided in advance, e.g., manually.

At this point, suppose that, in order to prevent failure to attach the tag, a part which can be read as a part related to the tag if only a little is selected as the part of the phrase based on dependency between words. For example, a whole phrase including a word (modifier) before each particle is selected as the part of the phrase based on dependency between words. For example, suppose that, in the case of text "MUKASHI WA YOKU MACHI NO DAGASHIYA SANN NI IKU NOGA SUKI DESHITA.", instead of "MACHI" and "DAGASHI YA SANN", "MACHI NO DAGASHI YA SANN" is selected as the part of the phrase based on dependency between words.

In addition, even one of modifiers is selected as the part of the phrase based on dependency between words. For example, suppose that, in the case of text "TABISAKI DE YOKU SURU SUPOTSU WA ARIMASUKA ?", "TABI-SAKI" is selected as the part of the phrase based on dependency between words. Note that, as in this example, instead of the phrase consisting of a plurality of words, a word itself may be selected as the part of the phrase based on dependency between words.

In addition, suppose that an expression which limits an area such as, e.g., an expression "xx RAHENN" or "xx WO SURU TOKORO" is also selected as the part of the phrase based on dependency between words. For example, suppose that, in the case of text "JITAKU NO CHIKAKU NI SUPOTSU GA DEKIRU TOKORO WA ARIMASUKA ?", instead of "JITAKU", "CHIKAKU", and "TOKORO", each of "JITAKU NO CHIKAKU" and "SUPOTSU GA DEKIRU TOKORO" is selected as the part of the phrase based on dependency between words.

For example, text "KYOU WA {EKIMAE NO RAMEN-NYA} NI ITTEKITA." is inputted into the learning data generation section 1. {EKIMAE NO RAMENNYA} represents the part of the phrase based on dependency between words.

The learning data generation section 1 generates, by using a plurality of pieces of inputted text in which the part of the phrase based on dependency between words is indicated, learning data which is a plurality of pieces of text-related information corresponding to the plurality of pieces of text (Step S1).

The text-related information is information related to text, and has, e.g., word-related information serving as information which is related to each word included in the text and includes part-of-speech information, and a tag which is associated with the word-related information of each word and in which the phrase based on dependency between words is taken into consideration. Herein, a description will be made by using an example in the case where the part-of-speech information is included as the word-related information, but the text-related information does not need to include the part-of-speech information as long as the word-related information can identify the phrase.

The generated learning data is outputted to the learning section 2.

Hereinafter, processes of the learning data generation section 1 will be described in greater detail.

[[[Separation Section 11]]]

The separation section 11 of the learning data generation section 1 receives, as an input, a plurality of pieces of text in which the part of the phrase based on dependency between words is indicated which are inputted into the learning data generation section 1, and separates each of the plurality of pieces of inputted text into a text sentence serving as information on a text body, and the phrase part (Step S11).

The separated text sentence is outputted to the word-related information generation section 12. The separated phrase part is outputted to the correct tag attachment section 13.

For example, the separation section 11 separates text "KYOU WA {EKIMAE NO RAMENN YA} NI ITTEKITA." into a text sentence "KYOU WA EKIMAE NO RAMENN YA NI ITTEKITA." and a phrase part "EKIMAE NO RAMENNYA".

[[[Word-Related Information Generation Section 12]]]

The text sentence is inputted into the word-related information generation section 12 of the learning data generation section 1.

The word-related information generation section 12 generates, by using the text sentence, the word-related information serving as information which is related to each word included in the text and includes at least the part-of-speech information (Step S12).

The generated word-related information of each word is outputted to the correct tag attachment section 13.

The word-related information includes at least the part-of-speech information serving as information on, e.g., the part of speech of the word. The word-related information may include the word itself. In other words, the word-related information may include the word-related information serving as the information which is related to each word included in the text and includes at least the part-of-speech information, and the word itself to which the tag which is associated with the word-related information of each word and in which the phrase based on dependency between words is taken into consideration is attached.

The word-related information generation section 12 performs morphological analysis by using an existing morphological analysis engine such as, e.g., MeCab to generate the word-related information. For MeCab, please refer to [http://taku910.github.io/mecab/].

For example, the morphological analysis section 121 of the word-related information generation section 12 performs morphological analysis of the text sentence to thereby divide the text sentence into words. Subsequently, the part-of-speech assignment section 122 of the word-related information generation section 12 assigns the part of speech to each word obtained by the division. In this case, information on the word obtained by the division and the part of speech assigned to the word obtained by the division serves as the word-related information.

For example, the morphological analysis section 121 of the word-related information generation section 12 performs morphological analysis of a text sentence "KYOU WA EKIMAE NO RAMENNYA NI ITTEKITA." to thereby separate the text sentence into words "<S>/KYOU/WA/EKIMAE/NO/RAMENN/YA/NI/I/T/TE/KI/TA/./</S>", as shown in the left column of a table in FIG. 5. Herein, "<S>" is a symbol attached so as to indicate the beginning of the sentence, and "</S>" is a symbol attached so as to indicate the end of the sentence. As shown in this example, a word string obtained by morphological analysis may include symbols other than words such as "<S>" and "</S>".

Subsequently, as shown in the central column of the table in FIG. 5, the part-of-speech assignment section 122 of the word-related information generation section 12 assigns a part of speech (POS) to each word. In the example in FIG. 5, a label "BOS" is attached to "<S>", a part of speech "noun: date and time: conjunctive" is assigned to "KYOU", a part of speech "conjunctive particle" is assigned to "WA", a part of speech "noun" is assigned to "EKIMAE", a part of speech "case particle" is assigned to "NO", the part of speech "noun" is assigned to "RAMENN", a part of speech "noun suffix" is assigned to "YA", a part of speech "case particle: conjunctive" is assigned to "NI", a part of speech "verb stem" is assigned to "I", a part of speech "verb conjugated word" is assigned to "T", a part of speech "verb inflected suffix" is assigned to "TE", the part of speech "verb stem" is assigned to "KI", a part of speech "verb suffix" is assigned to "TA", a part of speech "period" is assigned to ".", and a label "EOS" is attached to "</S>". "BOS" represents initials of "Beginning Of Sentence" and is a label indicative of the beginning of a sentence, and "EOS" represents initials of "End Of Sentence" and is a label indicative of the end of a sentence. As shown in this example, in the case where symbols other than words (e.g., "<S>" and "</S>") are included in the word string obtained by morphological analysis, labels (e.g., "BOS" and "EOS") may be attached to the symbols other than words.

[[[Correct Tag Attachment Section 13]]]

The phrase part and the word-related information of each word are inputted into the correct tag attachment section 13.

The correct tag attachment section 13 attaches a correct tag to the word-related information of each word by using the phrase part and the word-related information of each word (Step S13), and outputs the word-related information of each word to which the correct tag is attached to the learning section 2 as learning data which is a plurality of pieces of text-related information corresponding to a plurality of pieces of text. The phrase part is the part of the phrase based on dependency between words, and hence the tag attached by the correct tag attachment section 13 serves as the tag which is associated with the word-related information of each word and in which the phrase based on dependency between words is taken into consideration.

For example, as shown in the right column of the table in FIG. 5, the correct tag attachment section 13 attaches a tag [START] to the word-related information of "<S>", attaches a tag [B-LOC] to the word-related information of "EKIMAE", attaches a tag [I-LOC] to the word-related information of "NO", attaches the tag [I-LOC] to the word-related information of "RAMENN", attaches the tag [I-LOC] to the word-related information of "YA", attaches a tag [END] to the word-related information of "</S>", and attaches a tag [NL] to the word-related information of each of the other words. As in this example, the tag indicative of the word or the symbol other than the part of the phrase based on dependency between words may be attached to the word or the symbol other than the part of the phrase based on dependency between words.

Herein, [START] is the tag representing the head of a sentence, [END] is the tag representing the end of the sentence, [B-LOC] is the tag representing the leading word of the phrase representing "location", [I-LOC] is the tag representing the word subsequent to the word corresponding to [B-LOC] in the phrase representing "location", and [NL] is the tag indicating that the word is not the word of the phrase representing "location".

[[Learning Section 2]]

Into the learning section 2, the learning data which is outputted from the learning data generation section 1 and is the word-related information of each word to which the correct tag is attached is inputted.

The learning section 2 generates, by using the learning data, a tagging model including probability-related information which serves as information related to the probability that each tag is associated with each word-related information, and joint probability-related information which serves as information related to a joint probability serving as the probability of appearance of each tag in which appearance frequencies of a plurality of consecutive tags associated with pieces of word-related information of a plurality of consecutive words in each text are taken into consideration (Step S2).

The learning section 2 generates the tagging model by, e.g., a sequence labeling technique such as CRF. The learning section 2 may generate the tagging model by other methods such as a sequence labeling technique which uses deep learning.

The generated tagging model is outputted to the storage section 3.

The probability-related information may have a higher value as the probability that each tag is associated with each word-related information is higher, or may also have a higher value as the probability that each tag is associated with each word-related information is lower. An example of the value which becomes higher as the probability that each tag is associated with each word-related information becomes lower includes a cost when each tag is associated with each word-related information. A higher cost means lower certainty.

When let x denotes one sequence of the word-related information (i.e., corresponds to one sentence) serving as the learning data, let $x_t$ denote the t-th word-related information, and let $y_t$ denote the t-th tag, the probability that $y_t$ is attached to $x_t$ at the t-th position can be calculated by $p(y_t|x_t)$. Suppose that x or y which does not have a subscript t represents the word-related information or the tag which is not dependent on the appearance position in the sequence. A probability $p(y|x)$ that a tag y is attached to word-related information x can be calculated from $p(y,x)/p(x)$ according to the appearance frequencies in the learning data. Herein, $p(y,x)$ is the appearance frequency of the word-related information x to which the tag y is attached in the learning data, and $p(x)$ is the appearance frequency of the word-related information x in the learning data. For example, the cost can be determined by calculating the inverse of $p(y|x)$.

In addition, the probability-related information may also be the probability that each tag is associated with each word-related information itself. The probability-related information is calculated based on the appearance frequency of each tag associated with each word-related information in the learning data.

The joint probability-related information may have a higher value as the joint probability is higher, or may also have a higher value as the joint probability is lower. An example of the value which becomes higher as the joint probability becomes lower includes a joint cost when each tag in which the appearance frequencies of a plurality of consecutive tags associated with pieces of the word-related information of a plurality of consecutive words in each text are taken into consideration appears.

Herein, suppose that BOS (the beginning of a sentence), B-LOC (the first word of the tag of the location), I-LOC (the word subsequent to the tag of the location), NL (the word is not the tag of the location), and EOS (the end of the sentence) are present as tags, and an example of joint cost calculation will be described.

As the joint probability of tags from the t−2-th tag to the t-th tag, $p(y_t|y_{t-1}, y_{t-2})$ in which joints with the t−1-th tag and the t−2-th tag are reflected is calculated. For example, the probability that BOS, B-LOC, and I-LOC appear in this order can be expressed as $p(y_t=\text{I-LOC}|y_{t-1}=\text{B-LOC}, y_{t-2}=\text{BOS})$. With regard to the probability, the probability that, in the entire learning data, BOS, B-LOC, and I-LOC are attached to a string having $x_{t-2}$, $x_{t-1}$, and $x_t$ is calculated from the appearance frequencies in the learning data. Note that, with regard to an appearance probability, it is possible to calculate the joint probability $p(y_t=\text{I-LOC}|y_{t-1}=\text{B-LOC}, y_{t-2}=\text{BOS})$ in which the word-related information is reflected by calculating the appearance frequencies at which the sequence successively appears for the tags BOS, B-LOC, and I-LOC each having the word-related information. The joint cost can be determined by calculating the inverse of the joint probability.

A higher joint cost means lower certainty. In addition, the joint probability-related information may be the joint probability itself. The joint probability-related information is calculated based on the appearance frequency of each tag associated with each word-related information in the learning data.

In addition, the joint probability-related information may also be information related to the word-related information of a plurality of consecutive words in each text and the joint probability which serves as the probability of appearance of each tag in which the appearance frequencies of a plurality of consecutive tags associated with pieces of the word-related information of a plurality of consecutive words in the text are taken into consideration.

The word-related information of a plurality of consecutive words denotes the word-related information of a plurality of consecutive words including a word corresponding to a target tag to be processed. For example, the word-related information of a plurality of consecutive words denotes the word-related information of words constituting a string of n+1 words from the n-th word previous to the word corresponding to the target tag to be processed to the word corresponding to the target tag to be processed. In addition, the word-related information of a plurality of consecutive words may also denote the word-related information of words constituting a string of 2n+1 words from the n-th word previous to the word corresponding to the target tag to be processed to the n-th subsequent word corresponding to the target tag to be processed. n is an integer of 2 or more. For example, n=2 is satisfied.

Figure 6:
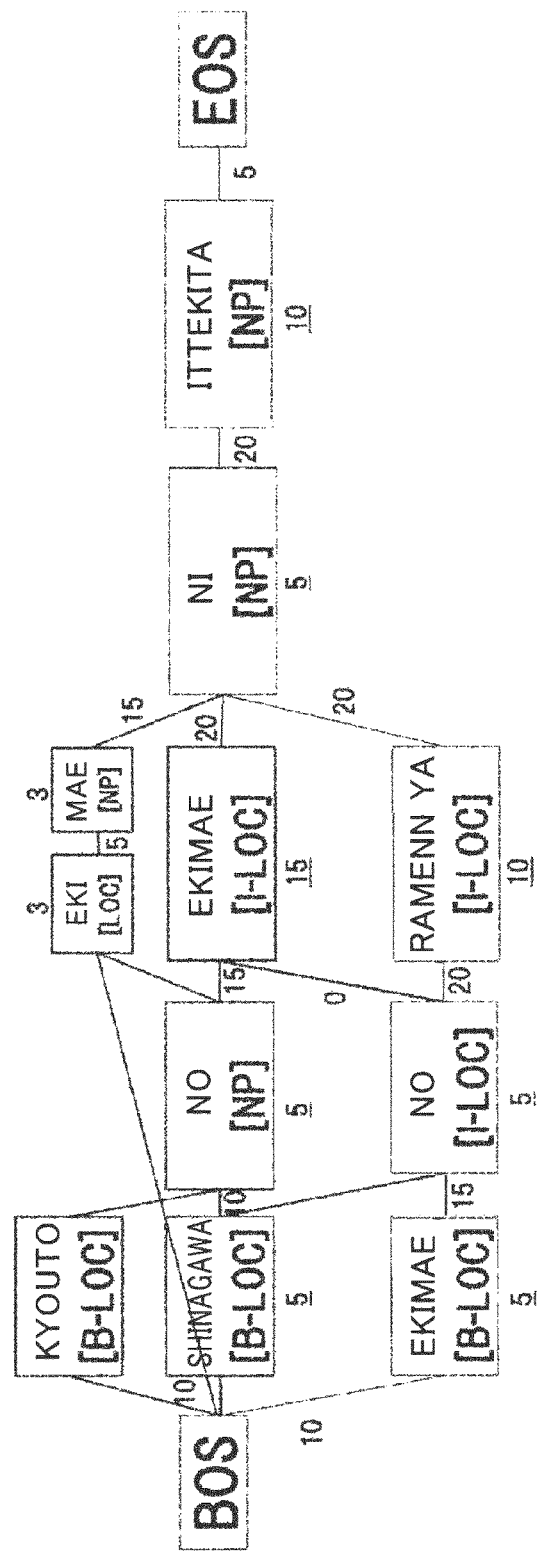
FIG. 6 is a view showing examples of probability-related information and joint probability-related information.

FIG. 6 shows examples of the probability-related information and the joint probability-related information when the learning section 2 has performed learning by using learning data of text "KYOUTO NO EKIMAE NI ITTEKITA", "SHINAGAWA NO EKIMAE NI ITTEKITA", "EKIMAE NI ITTEKITA" and "EKIMAE NO RAMENN YA NI ITTEKITA". In examples in FIG. 6, a cost when each tag is associated with each word-related information is used as the probability-related information, and a joint cost when each tag in which the appearance frequencies of a plurality of consecutive tags associated with pieces of the word-related information of a plurality of consecutive words in each text are taken into consideration appears is used as the joint probability-related information. In FIG. 6, each underlined number indicates the cost serving as the probability-related information, and each number which is not underlined indicates the joint cost serving as the joint probability-related information.

[[Storage Section 3]]

The generated tagging model is inputted into the storage section 3.

The storage section 3 stores the inputted tagging model (Step S3).

By using the tagging model generation apparatus and the tagging model generation method described above, it is possible to generate the tagging model for attaching the tag in consideration of the phrase based on dependency between words.

[Tagging Apparatus and Tagging Method]

Figure 3:
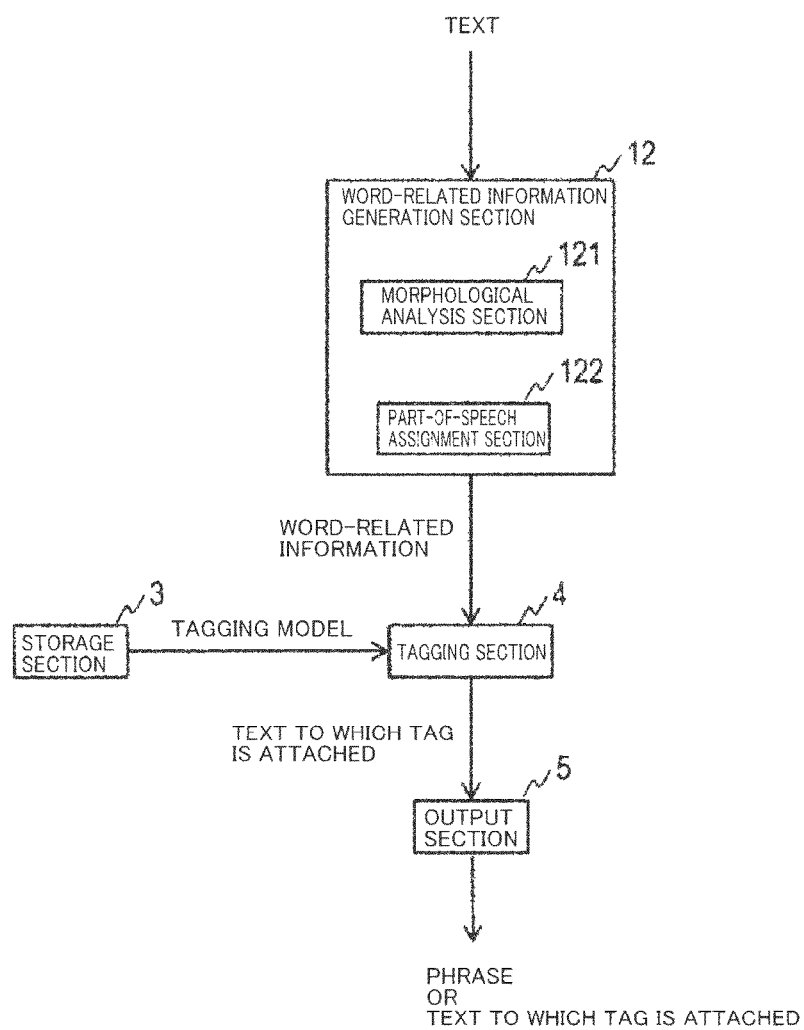
FIG. 3 is a view showing an example of the functional configuration of a tagging apparatus.

As shown in FIG. 3, the tagging apparatus includes, e.g., a storage section 3, a word-related information generation section 12, a tagging section 4, and an output section 5.

Figure 4:
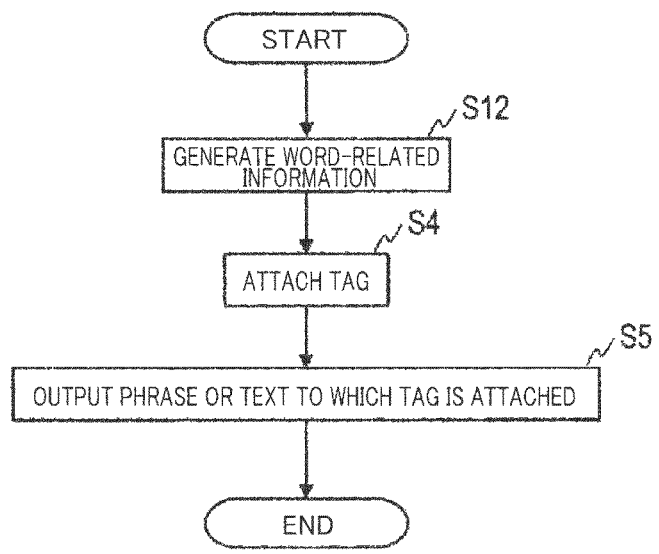
FIG. 4 is a view showing an example of a process procedure of a tagging method.

The individual sections of the tagging apparatus performs the following and processes from Step S4 to Step S5 shown by way of example in FIG. 4, and the tagging method is thereby implemented.

[[Storage Section 3]]

The storage section 3 is the same as the storage section 3 of the tagging model generation apparatus.

That is, in the storage section 3, the tagging model generated by the tagging model generation apparatus is stored.

[[Word-Related Information Generation Section 12]]

The word-related information generation section 12 is the same as the word-related information generation section 12 of the tagging model generation apparatus except that processes are performed not on a text sentence but on text. Hereinafter, a duplicate description of the same portions will be omitted.

That is, text is inputted into the word-related information generation section 12.

In addition, the word-related information generation section 12 generates, by using the text, word-related information which serves as information related to each word included in the text and including at least part-of-speech information (Step S12).

The generated word-related information of each word is outputted to the tagging section 4.

[[Tagging Section 4]]

The tagging model read from the storage section 3 and the word-related information of each word are inputted into the tagging section 4.

The tagging section 4 attaches a likely tag to each word in the inputted text by using the tagging model and the word-related information of each word (Step S4).

The text in which the tag is attached to each word is outputted to the output section 5.

In the case where the probability-related information included in the tagging mode is the cost and the joint probability-related information included therein is the joint cost, the tagging section 4 attaches the likely tag to each word in the inputted text, e.g., in the following manner.

The tagging section 4 attaches the likely tag to each word in the inputted text by attaching each tag to the word-related information of each word such that a score when each tag is attached to the word-related information of each word is minimized by using the tagging model and the word-related information of each word. Herein, as the value of the score is higher, a likelihood is lower. An example of the score includes the sum of the cost when each tag is attached to the word-related information of each word and the joint cost when each tag is attached to each of a plurality of consecutive words including each word. The cost and the joint cost are obtained by inputting the word-related information of each word and each tag to be attached into the tagging model.

Figure 7:
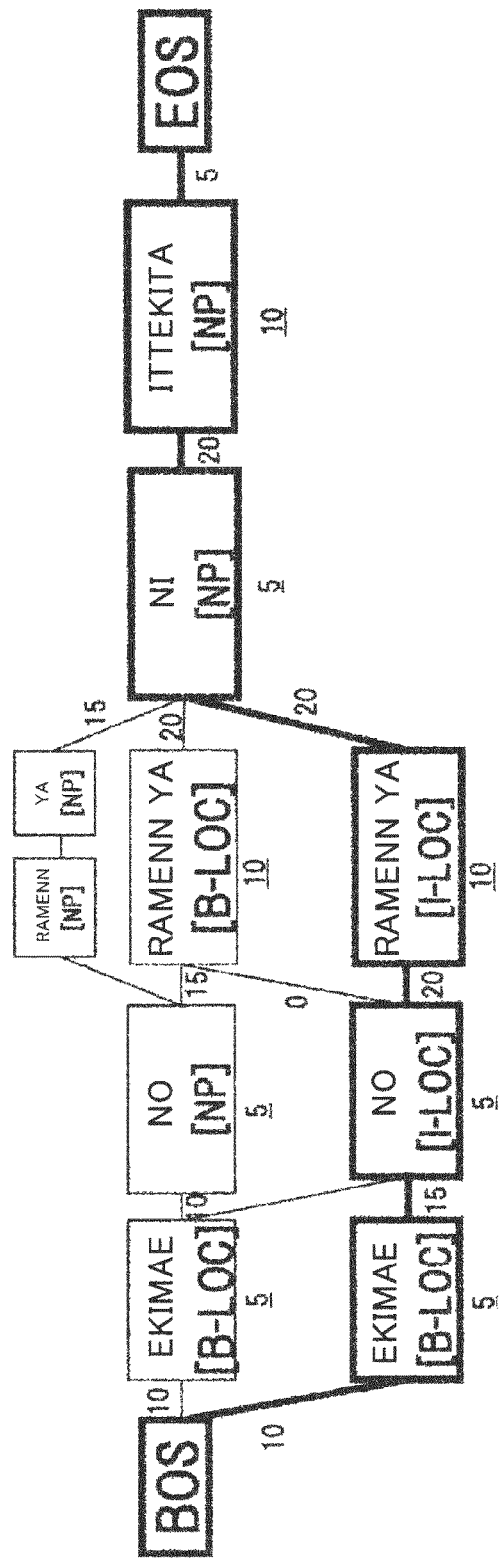
FIG. 7 is a view showing an example of a path representing attachment of each tag to the word-related information of each word.

As shown by way of example in FIG. 7, suppose that the attachment of each tag to the word-related information of each word is represented by a plurality of paths. Suppose that, with a given path, a combination of tags corresponding to the given path is associated and, with a different path, a combination of different tags is associated. In addition, suppose that, in the case where the given path is selected, the combination of tags corresponding to the path is attached to the word-related information of the word on the path.

Note that each underlined number in FIG. 7 indicates the cost when the tag corresponding to the number is attached to the word-related information of the word corresponding to the number, and each number in FIG. 7 which is not underlined indicates the joint cost when the tag is attached to each of a plurality of consecutive words including the word corresponding to the number based on the combination of tags corresponding to the path. The cost and the joint cost are obtained by referring to the tagging model.

The tagging section 4 may attach the likely tag to each word in the inputted text by using such paths. For example, the tagging section 4 calculates the score when each path is selected based on the cost and the joint cost determined by the combination of tags corresponding to each path by using the tagging model and the word-related information of each word. Herein, as the value of the score is higher, the likelihood is lower. An example of the score includes the sum of the cost and the joint cost in the selected path. Subsequently, the tagging section 4 attaches the likely tag to each word in the inputted text by finally selecting the path having the lowest score and attaching the combination of tags corresponding to the finally selected path.

For example, in the example in FIG. 7, from among a plurality of paths each starting with "BOS" and ending with "EOS", a path shown in a thick line is finally selected as the path having the lowest score. As a result, a tag [B-LOC] is attached to "EKIMAE", a tag [I-LOC] is attached to "NO", the tag [I-LOC] is attached to "RAMENN YA", a tag [NL] is attached to "NI", and the tag [NL] is attached to "ITTEKITA".

[[Output Section 5]]

The text in which the tag is attached to each word is inputted into the output section 5.

The output section 5 outputs a phrase consisting of a plurality of consecutive words to which predetermined tags are attached by the tagging section 4.

In the case where the output of the phrase is not performed, the output section 5 may output the text in which the tag is attached to each word by the tagging section 4 without altering the text.

That is, the output section 5 outputs the phrase consisting of a plurality of consecutive words to which predetermined tags are attached by the tagging section 4, or the text in which the tag is attached to each word by the tagging section 4 without altering the text (Step S5).

For example, when a phrase representing a location is to be detected, the output section 5 couples a string of words from a word to which [B-LOC] is attached to the last word to which [I-LOC] is attached and outputs the coupled words as the phrase representing the location.

For example, in the case where the path in the thick line in FIG. 7 is finally selected in the tagging section 4, the output section 5 outputs "EKIMAE NO RAMENN YA" as the phrase representing the location.

In a conventional named entity extraction technique, a proper noun or the like registered in a dictionary such as, e.g., "TOUKYOU" or "TOUKYOU TAWA" is a target to be extracted, and hence, in the case where an expression "TOUKYOU NO TAWA" is used, it is not possible to extract the expression as "location".

In contrast to this, by attaching the tag in consideration of the phrase based on dependency between words according to the tagging model generation apparatus, the tagging model generation method, the tagging apparatus, and the tagging method described above, it becomes possible to extract the expression based on the dependency which is not registered in the dictionary such as "TOUKYOU NO TAWA" as "location".

Accordingly, in the case where the tagging apparatus and the tagging method described above are used in, e.g., an automated response system or a dialogue system, it is possible to generate more proper speech. In addition, it is possible to increase a feeling that the automated response system or the dialogue system understands the speech of a user.

A test result that detection accuracy of a location phrase during a chat was improved from 30% to 75% by using the tagging model generation apparatus, the tagging model generation method, the tagging apparatus, and the tagging method described above was obtained. The detection accuracy mentioned herein denotes an accuracy rate at which, in data to which "a location phrase including a modifier" and "a location modified by another modifier" are tagged as correct answers of the location phrase, the word and the entire phrase are correctly detected. Note that data used in the test is not included in data used in learning.

In the measurement of the detection accuracy, with regard to whether or not the word or the phrase was ambiguous as a target to be understood as a location or the segment of the phrase was ambiguous, location ambiguity labels were attached in advance according to classification shown in FIG. 8, and the detection accuracy was calculated only for data "which people recognized as the location without feeling ambiguity" (data to which a location ambiguity label 0 was attached in FIG. 8).

Locations having proper nouns and the like occupied about 30%, it became possible to detect a portion which had been recognized as part of a phrase and had not been detected, and the detection accuracy was thereby improved by 45%.

It is known that, as described above, a target consisting of a phrase appears frequently during a chat, and it can be expected that phrases other than the phrase of "location" such as phrases of "time", "means", and "impression" can be detected by using the same technique.

[Modifications]

[[Modification 1]]

While the description has been made by using the case where the tag of "location" is attached as the example thus far, the tagging model generation apparatus, the tagging model generation method, the tagging apparatus, and the tagging method may be used to attach tags other than the tag of "location". It is possible to use the tagging model generation apparatus, the tagging model generation method, the tagging apparatus, and the tagging method to attach tags other than the tag of "location" such as tags of "time", "subject", "action", "means", and "reason" which correspond to so-called 5W1H, and to attach a tag of a target subjected to grounding by a person. The grounding mentioned herein denotes associating a selected part (a word or a phrase) in a sentence with a semantic label indicative of the meaning of the part.

The tag may also be defined hierarchically. In a tag of a broad category "animal", tags of two narrow categories "animal which can be kept as a pet" and "animal which cannot be kept as a pet" are present. In the tag of the broad category "animal", tags of two narrow categories "cat family" and "dog family" are present. In addition, in a tag of a broad category "food and drink", tags of two narrow categories "food" and "drink" are present. Further, in a tag of a broad category "impression", tags of two narrow categories "happy feeling" and "sad feeling" are present.

Thus, in the case where the tag is defined hierarchically, the tag of the broad category may be used as the tag, or the tag of the narrow category may also be used as the tag.

For example, in the case where the tag of the narrow category "sad feeling" in the tag of the broad category "impression" is used as the tag, by using the tagging model generation apparatus, the tagging model generation method, the tagging apparatus, and the tagging method described above, it is possible to attach a tag "impression: sad feeling" to a part "ZANNNENN DATTA" in text "KINOU WA GOHANN WO TABE RARE NAKUTE ZANNNENN DATTA.".

In addition, in the case where the tag of the narrow category "drink" in the tag of the broad category "food and drink" is used as the tag, by using the tagging model generation apparatus, the tagging model generation method, the tagging apparatus, and the tagging method described above, it is possible to attach a tag "food and drink:drink" to a part "DAISUKI NA KOUCHA" in text "ONAKA IPPAI DAKEDO DAISUKI NA KOUCHA WA NONNDA.".

The number of levels of the category may be three or more instead of two.

In addition, a plurality of tags may be combined and used. In the case where a plurality of tags are combined and used, the processes of the tagging model generation apparatus, the tagging model generation method, the tagging apparatus, and the tagging method are performed on each of the plurality of tags.

[[Modification 2]]

For example, the number of types of the word-related information of each word in the case where the amount of learning data is equal to or less than a predetermined reference value may be smaller than the number of types of the word-related information of each word in the case where the amount of learning data is greater than the predetermined reference value. That is, in accordance with the amount of learning data, the type of the word-related information may be adjusted. This is because, when the number of types of learning data is small, data becomes sparse, and it is feared that many pieces of inappropriate data will be present or an overlearning state will be established.

It is determined whether or not the amount of learning data is equal to or less than the predetermined reference value by, e.g., determining whether or not learning data satisfies a predetermined reference. For example, in the case where, among a plurality of patterns of "a sequence of the word-related information of a word string (in which n+1 words are coupled) up to the n-th previous word when the joint probability is determined" which is needed as learning data, at least one pattern which has only one piece of learning data is present, it is determined that "the amount of learning data is equal to or less than the predetermined reference value".

For example, only representative parts of speech such as "noun" and "case particle" may be used as the word-related information in the case where the amount of learning data is equal to or greater than the predetermined reference value, and more detailed parts of speech such as "noun: conjunctive" and the like may be used as the word-related information in the case where the amount of learning data is greater than the predetermined reference value. Herein, ":" represents coupling of parts of speech, and "noun: conjunctive" represents one part of speech obtained by integrating the part of speech "noun" and the part of speech "conjunctive".

Thus, by using a plurality of parts of speech which are coupled together using ":" as one part of speech, it is possible to increase the number of types of the part of speech. In the case where the amount of learning data is greater than the predetermined reference value, for example, by using the part of speech of which the number of types is increased in this manner, the number of types of the word-related information may be increased.

In other words, the number of pieces of the word-related information of each word in the case where the amount of learning data is greater than the predetermined reference value may be made larger than the number of pieces of the word-related information of each word in the case where the amount of learning data is equal to or less than the predetermined reference value by including part-of-speech information of a narrow category of the part-of-speech information included in the word-related information of each word in the case where the amount of learning data is equal to or less than the predetermined reference value. The adjustment of the type of the word-related information corresponding to the amount of learning data may be performed in the word-related information generation section 12, or may also be performed in the learning section 2.

When the adjustment of the type of the word-related information corresponding to the amount of learning data is performed in the word-related information generation section 12, in the case where the amount of learning data is equal to or less than the predetermined reference value, the word-related information generation section 12 generates the word-related information of each word by using the word-related information of which the number of types is smaller than the number of types of the word-related information in the case where the amount of learning data is greater than the predetermined reference value.

When the adjustment of the type of the word-related information corresponding to the amount of learning data is performed in the learning section 2, in the case where the amount of learning data is equal to or less than the predetermined reference value, the learning section 2 performs learning by using the word-related information of which the number of types is smaller than the number of types of the word-related information in the case where the amount of learning data is greater than the predetermined reference value.

While the embodiments of the invention have been described thus far, the specific configuration is not limited to these embodiments, and it will be understood that, even when appropriate design changes are made without departing from the gist of the invention, the configuration is included in the invention.

In addition, various processes described in the embodiments may be executed time-sequentially according to the order of the description as well as being executed in parallel or individually according to processing capacity of an apparatus which executes the processes or on an as-needed basis.

[Program, Recording Medium]

In the case where various process functions in the individual apparatuses described in the above embodiments are implemented by a computer, the process contents of the functions which the individual apparatus should have are described in a program. By executing the program with the computer, the various process functions in the individual apparatuses are implemented on the computer.

The program in which the process contents are described can be recorded in a computer-readable recording medium. As the computer-readable recording medium, for example, any of a magnetic recording device, an optical disk, a magneto-optical recording medium, and a semiconductor memory may be used.

In addition, distribution of the program is performed by, e.g., selling, transferring, or lending a portable recording medium in which the program is recorded such as a DVD or a CD-ROM. Further, the program may also be distributed by storing the program in a storage apparatus of a server computer in advance and transferring the program from the server computer to another computer via a network.

First, the computer which executes such a program temporarily stores the program recorded in the portable recording medium or the program transferred from the server computer in a storage apparatus of the computer. Subsequently, at the time of execution of each process, the computer reads the program stored in the storage apparatus of the computer, and executes the process corresponding to the read program. As another execution mode of the program, the computer may read the program directly from the portable recording medium and execute the process corresponding to the program. Further, every time the program is transferred to the computer from the server computer, the process corresponding to the received program may be executed one by one. In addition, the above process may be executed with a so-called ASP (Application Service Provider)-type service in which the transfer of the program to the computer from the server computer is not performed and the process function is implemented only with an execution instruction and result acquisition. Note that the program in the present mode includes information which is used for processing by an electronic calculator and is based on a program (data which is not a direct command to the computer and has a property which specifies the process of the computer).

In addition, in this mode, the present apparatuses are configured by executing a predetermined program on a computer, but at least part of the process contents may be implemented by using hardware.

REFERENCE SIGNS LIST

1 Learning data generation section
11 Separation section
12 Word-related information generation section
121 Morphological analysis section
122 Part-of-speech assignment section
13 Correct tag attachment section
2 Learning section
3 Storage section
4 Tagging section
5 Output section

The invention claimed is:
1. A tagging model generation apparatus comprising:
circuitry configured to implement
a learning section that generates a tagging model by using inputted learning data,
the learning data being a plurality of pieces of text-related information corresponding to a plurality of pieces of text,
each of the plurality of pieces of text-related information serving as information related to the text,
each of the plurality of pieces of text-related information having word-related information,
the word-related information serving as information related to each word included in the text and including at least part-of-speech information, each of the plurality of pieces of text-related information having a tag which is associated with the word-related information of each word and in which a phrase marked as including related words is taken into consideration, the tagging model including probability-related information and joint probability-related information, the probability-related information serving as information related to a probability that each tag is associated with each word-related information, the joint probability-related information serving as information related to a joint probability, the joint probability serving as a probability of appearance of a plurality of consecutive tags in a predetermined order, the plurality of consecutive tags being associated with pieces of word-related information of a plurality of consecutive words in each text; and a storage section that stores the generated tagging model.

2. The tagging model generation apparatus according to claim 1, wherein the word-related information includes the word-related information serving as the information which is related to each word included in the text and includes at least the part-of-speech information, and a word itself to which the tag which is associated with the word-related information of each word and in which the phrase marked as including the related words is taken into consideration is attached.

3. The tagging model generation apparatus according to claim 1, wherein the number of pieces of the word-related information of each word, in a case where an amount of the learning data is greater than a predetermined reference value, is made larger than the number of pieces of the word-related information of each word, in a case where the amount of the learning data is equal to or less than the predetermined reference value, by including part-of-speech information of a narrow category of the part-of-speech information included in the word-related information of each word in the case where the amount of the learning data is equal to or less than the predetermined reference value.

4. A tagging apparatus comprising:

circuitry configured to implement a tagging section for attaching, by using the tagging model generated by the tagging model generation apparatus according to claim 1 and word-related information serving as information related to each word included in inputted text, a tag to each word in the inputted text; and art output section for outputting a phrase consisting of a plurality of consecutive words to which predetermined tags are attached by the tagging section or the text in which the tag is attached to each word by the tagging section.

5. A tagging model generation method comprising:

a learning step of causing a learning section to generate a tagging model by using inputted learning data, the learning data being a plurality of pieces of text-related information corresponding to a plurality of pieces of text, each of the plurality of pieces of text-related information serving as information related to the text, each of the plurality of pieces of text-related information having word-related information, the word-related information serving as information related to each word included in the text and including at least part-of-speech information, each of the plurality of pieces of text-related information having a tag which is associated with the word-related information of each word and in which a phrase marked as including related words is taken into consideration, the tagging model including probability-related information and joint probability-related information, the probability-related information serving as information related to a probability that each tag is associated with each word-related information, the joint probability-related information serving as information related to a joint probability, the joint probability serving as a probability of appearance of a plurality of consecutive tags in a predetermined order, the plurality of consecutive tags being associated with pieces of word-related information of a plurality of consecutive words in each text; and a storage step of causing a storage section to store the generated tagging model.

6. A tagging method comprising:

a tagging step of causing a tagging section to attach, by using the tagging model generated by the tagging model generation method according to claim 5 and word-related information serving as information related to each word included in inputted text, a tag to each word in the inputted text; and an output step of causing an output section to output a phrase consisting of a plurality of consecutive words to which predetermined tags are attached by the tagging section or the text in which the tag is attached to each word by the tagging section.

7. A non-transitory computer readable medium including computer instructions for causing a computer to perform the steps of claim 5.

* * * * *